May 29, 1928.

A. A. FRANKEL 1,671,418

BANK CHECK AND STUB

Filed July 3, 1926

WITNESSES:
Alfred E. Tschinger
Wesley P. Merrill

INVENTOR:
Armin A. Frankel,
BY
Joshua R. H. Potts
ATTORNEY.

Patented May 29, 1928.

1,671,418

UNITED STATES PATENT OFFICE.

ARMIN A. FRANKEL, OF PHILADELPHIA, PENNSYLVANIA.

BANK CHECK AND STUB.

Application filed July 3, 1926. Serial No. 120,336.

My invention relates to bank checks and more particularly to checks issued in lieu of wages or salaries.

The main object of my invention is to eliminate certain errors and losses, thus providing better protection to the maker of the check and of the person cashing same.

Under the present system of paying employees by check, oftentimes the checks are distributed by a subordinate employee so that the office has no immediate record that each man received the check belonging to him.

When an employee cashes his check he usually presents same to a grocer or other merchant who, unless personally acquainted with the man, has no means of knowing whether the check presented is the property of the person presenting same or whether he has stolen or found it.

In my invention I propose to provide means for overcoming these objectionable features.

This object, and other advantageous ends which will be described hereinafter, I attain in the following manner, reference being had to the accompanying drawing in which Figure 1 is the face view of a preferred embodiment of my invention, and Figure 2 is the reverse side thereof.

Referring to the drawing, 1 represents the face of a salary check printed in accordance with the usual method of printing such checks, the matter on the face of the check may of course be adapted to the user's needs. The printed matter differs from the ordinary check in that it contains a space to insert the date to which services are paid by this check, as indicated at 2. 3 is the usual stub which remains in the check book, being detachable from the other stub and check by perforations, as indicated at 4. 5 is an office stub which is signed by the employee when he receives the check and detached at the perforations 6 and returned to the office by the employee who delivers the check, thus showing the paymaster that the right party has received the check. 7 represents the cashier's stub on which is printed an approximate legend directing the employee to sign his name and address, on lines 8 and 9 respectively, in the presence of the employee delivering the check.

When cashing the check, the payee presents it to a merchant or other person and endorses same on line 10 on the reverse side of the check. The person cashing the check tears off the stub 7 and compares the endorsement with the signature on the stub, thus being assured that the party cashing the check is entitled to the money called for on the face of same. He then files the "payor's stub" so that he may have the name and address of the payee in case any question concerning the check should arise later. These stubs also provide him with names and addresses for circularization or other means of advertising.

After the check has been passed through the banks and returned to the maker, he has a receipt for the wages or salary of that particular employee to the date indicated on the face of the check.

While I have described my invention as taking a particular form, it will be understood that the various parts may be changed without departing form the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

As an article of manufacture a single strip of material divided by lines of demarcation into distinct sections but separably united by a line of scoring, one of said sections having appropriately designated spaces adapting it for use as a negotiable instrument and the other section having appropriately designated spaces for the signature of the payee and adapted to be issued integral with said negotiable instrument, and an appropriately designated space on the back of the negotiable instrument section adjacent the line of scoring for the indorsement of the payee.

In testimony whereof I have signed my name to this specification.

ARMIN A FRANKEL.